Sept. 9, 1958 J. E. SCHEIDEGGER 2,850,835
ANIMAL TRAPS
Filed Nov. 26, 1956
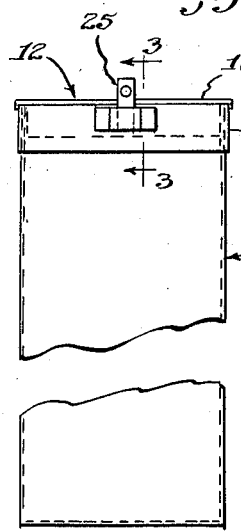
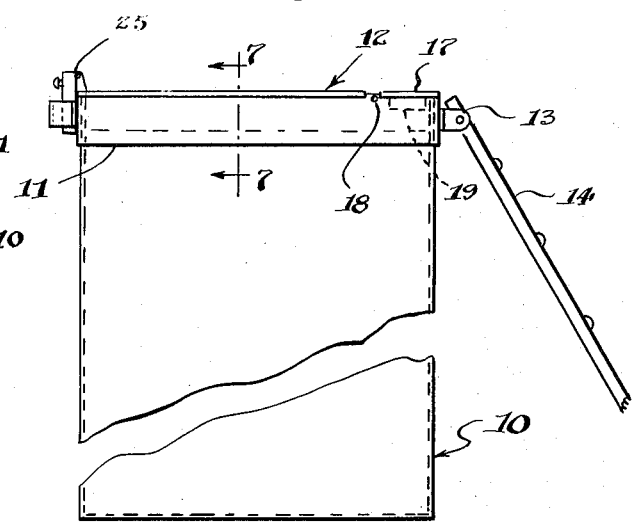
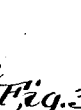
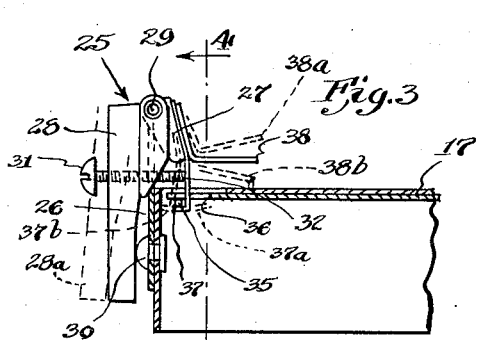
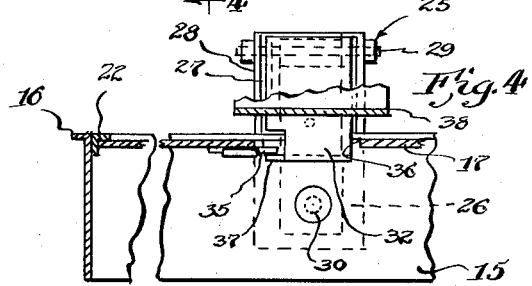
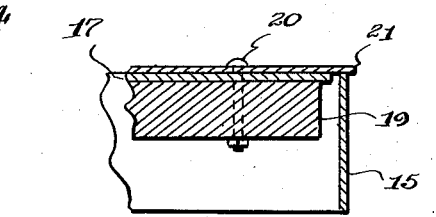
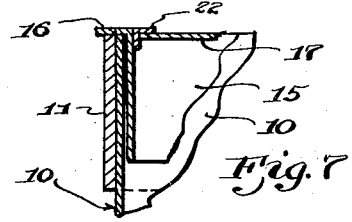
INVENTOR.
John E. Scheidegger
BY
Hauser Hardisty
Attorneys.

United States Patent Office 2,850,835
Patented Sept. 9, 1958

2,850,835

ANIMAL TRAPS

John E. Scheidegger, Detroit, Mich.

Application November 26, 1956, Serial No. 624,372

6 Claims. (Cl. 43—70)

My invention relates to animal traps and more particularly to an automatically resetting trap adaptable for continuous trapping of small animals such as rats, mice, and the like, where the use of poisons and single shot traps are either ineffective or undesirable.

In some places, particularly commercial or farm establishments, and even in the home where the use of poisons may be dangerous, and where large scale trapping is desired, or where live speciments of various types must be obtained, the use of trap-door type devices, operable to drop the animals into a container or cage of some kind, are sometimes desirable. In cases where disposal is desired, a suitable container may be partially filled with water, in which the trapped animal will drown.

However, such traps which automatically reset themselves after each capture, are usually complicated and often malfunction, due to the use of springs and other mechanisms, and in addition are often expensive and difficult to repair.

An object of my present invention is to provide an improved trap by constructing a springless automatically resetting mechanism operable with a counterweighted trap door type of trap.

Another object of the invention is to provide an improved trap by constructing a simplified trap door latching mechanism operable to be tripped by either of two opposite actuating movements.

A further object of the invention is to simplify construction and handling of animal traps by providing a complete trapping mechanism removably supported as a unit on the top of a trap container.

For a more complete understanding of the invention reference may be made to the accompanying drawing illustrating a preferred embodiment of the invention in which like characters refer to like parts throughout the several views and in which Fig. 1 is a side elevational view of the container and trapping mechanism.

Fig. 2 is an end elevational view of the container and trapping mechanism.

Fig. 3 is a cross-sectional view of the trapping mechanism taken substantially on the line 3—3 of Fig. 2.

Fig. 4 is a fragmentary cross-sectional view taken substantially on line 4—4 of Fig. 3.

Fig. 5 is a fragmentary longitudinal sectional view illustrating the trap door hinge and counterweight assembly.

Fig. 6 is a fragmentary cross-sectional detail taken substantially on the line 5—5 of Fig. 1, and Fig. 7 is a fragmentary cross sectional detail taken substantially on the line 6—6 of Fig. 1.

In Figs. 1 and 2, a preferred open-topped container 10 is illustrated as having a peripheral stiffener around the open top and supporting a trapping mechanism 12 thereon. A bracket 13 is provided preferably at the end of the container and a ramp 14 is preferably hinged thereto as shown in Fig. 1. The ramp 14 may rest on the floor or any other site to provide ready access for the animal being trapped to the trapping mechanism 12. The container 12 may be partly filled with water if desired to kill the animal eventually trapped inside.

The trapping mechanism 12 comprises a frame 15 adapted to be positioned inside the open top of the container 10 and is provided with a laterally extending flange 16 which rests on the edge of the open top as shown in Fig. 7. A trap door 17 is disposed to overlie the open top of the container 10 and is hinged as at 18 to the frame 15 to swing downward into the container 10 under an animal's weight, as indicated by the dotted line position in Fig. 5. A counterweight 19 is secured by any suitable means such as bolts 20 to the trap door 17 to automatically return the trap door 17 to its horizontal position. A plate 21 is provided on the end of the trap door and has its edges extended to overlie the edge of the frame 15, as shown in Figs. 3 and 6, and the frame 15 has an inwardly flanged side member 22 adapted to overlie the side edges of the trap door as shown in Figs. 4 and 7 particularly, this arrangement assuring the proper horizontal position and alignment of the trap door 17.

A latching mechanism 25 is provided at the end of the trap door 17 opposite the hinge 18. An upstanding support member 26 is secured to the frame 15 as shown in Fig. 3. A latch member 27 and a counterweight member 28 are preferably hinged to the support member 26 on a common hinge axis by a pin 29. A stop 30 secured to the frame 15 prevents the counterweight member 28 from swinging to its plumb-line position, thereby limiting movement of the counterweight member 28 to outward positions such as indicated by the dotted line 28a of Fig. 3. An adjustable stop screw 31 is mounted on the counterweight member 28 and is adapted to contact a depending portion 32 of the latch member 27, limiting movement of the latch member 27 toward the counterweight member 28 and preventing the latch member 27 from swinging to its plumb-line position when the counterweight member 28 is against the stop 30.

A latch pin 35 is secured to the trap door 17 and extends into a cutout 36 in the end of the trap door 17. The depending portion 32 of the latch member 27 is arranged to extend into the cutout 36 and is provided with a locking lug element 37 which underrides the pin 35, as shown in Figs. 3 and 4. A bait holder element 38 is secured to the latch member 27 and a suitable bait (not shown) may be tied or otherwise secured thereto.

In operation, the animal, having approached the bait, will be on the trap door 17. In taking the bait, the bait holder will be moved either upward or downward respectively to the dotted line positions 38a or 38b, thereby moving the lug 37 to the respective dotted line positions 37a or 37b, either moving the latch member 27 away from the stop 31 or moving the counterweight member 28 away from the stop 30, thereby releasing the pin 35 to permit the trap door 17 to swing downward, precipitating the animal into the container 10. The trap door 17 will then swing up, and the pin 35 striking the lug 37 at a slight angle will bounce the latch member 27 away from the stop 31 momentarily, after which the lug 37 will once more move under the pin 35 in latching engagement.

The stop 31 may be adjusted to properly position the latch member 27 so that the lug 37 will be properly engaged with the pin 35, and may be so adjusted to vary this engagement in accordance with the degree of motion desired to trip the mechanism. It will of course be obvious that the stop 30 may be made adjustable in the same manner to achieve the same result.

Although I have described only one preferred embodiment of my invention, it will be apparent to one skilled in the art to which the invention pertains that var-

I claim:

1. In an animal trap including an open-topped container, a trap door hingedly carried by said container and counterweighted to be normally positioned horizontally over the container open top and to be swung downward into said container under the weight of an animal to precipitate same into said container, and a latching mechanism for selectively retaining said trap door in the normal position, said trap door having a keeper, said latching mechanism comprising a latch member hingedly carried by said container and adapted to normally engage said keeper and to be disengaged therefrom upon movement of the latch member in either direction about its hinge axis, a counterweight member hingedly carried by said container, a stop carried by said container and adapted to limit movement of said counterweight member in one direction, said counterweight member carrying a second stop adapted to bear on said latch member to position same in its engaged position when said counterweight member is against the first stop.

2. In an animal trap including an open-topped container, a trapping device removably supported at the open top of the container and comprising a frame, a trap door hingedly carried by said frame and counterweighted to be normally positioned horizontally over the container open top and to be swung downward into said container under the weight of an animal to precipitate same into said container, and a latching mechanism for selectively retaining said trap door in the normal position, said trap door having a keeper, said latching mechanism comprising a latch member hingedly carried by said frame and adapted to normally engage said keeper and to be disengaged therefrom upon movement of the latch member in either direction about its hinge axis, a counterweight member hingedly carried by said frame, a stop carred by said frame and adapted to limit movement of said counterweight member in one direction, said counterweight member carrying a second stop adapted to bear on said latch member to position same in its engaged position when said counterweight member is against the first stop.

3. In an animal trap including an open-topped container, a trapping device comprising a frame constructed and arranged to fit in the open top of the container and having a flange extending over the top edge of said container to removably support said frame at the container open-top, a trap door having a hinge carried by said frame near one end of the container open top, said trap door adapted to swing downward into said container in one direction only under the weight of an animal and having a counterweight operable to return same to a normal position horizontally over the container open top, said trap door having a keeper secured thereto, a latching mechanism for selectively retaining said trap door in the normal position aforesaid and supported by said frame exteriorly of said container, said latching mechanism comprising a latch member hingedly carried by said frame and adapted to normally engage said keeper for supporting said trap door in the normal position, said latch member constructed and arranged to disengage from said keeper upon movement of the latch member in either direction about its hinge axis and to reengage with said keeper upon return of said trap door to the normal position.

4. In an animal trap including an open-topped container, a trapping device removably supported at the open top of the container and comprising a frame, a trap door hingedly carried by said frame and counterweighted to be normally positioned horizontally over the container open top and to be swung downward into said container under the weight of an animal to precipitate same into said container, said frame having an upwardly-extending support member, said trap door having a keeper, a latching mechanism for selectively retaining said trap door in the normal position and comprising a latch member and a counterweight member hingedly supported by said support member on a common axis disposed above and laterally offset from said keeper, said latch member having a lug adapted to normally underride said keeper, a stop carried by said frame and adapted to contact said counterweight member to stop same from swinging to a plumb line position, a second stop carried by said counterweight member and adapted to contact said latch member to stop same from swinging to a plumb-line position when said counterweight is in contact with the first stop, said latch member and said counterweight member thereby enabled to swing together in a direction away from the counterweight member plumb-line position and said latch member only enabled to swing in the opposite direction, said latch member lug being disposed in an engaging position under the trap-door keeper only when said first and second stops are respectively contacting said counterweight member and said latching member.

5. In an animal trap including an open-topped container, a trap door hingedly carried by said container and counterweighted to be normally positioned horizontally over the container open top and to be swung downward in one direction only into said container under the weight of an animal to precipitate same into said container, said trap door having a keeper secured thereto, and a latching mechanism hingedly carried by said container and normally engaged with said keeper to lock said trap door in the normal position, said latching mechanism constructed and arranged to be selectively actuated in either direction and to disengage from said keeper upon actuation in either direction to permit said trap door to swing downward.

6. In an animal trap including an open-topped container, a trapping device removably supported at the open top of the container and comprising a frame, a trap door hingedly carried by said frame and counterweighted to be normally positioned horizontally over the container open top and to be swung downward into said container under the weight of an animal to precipitate same into said container, and a latching mechanism for selectively retaining said trap door in the normal position, said trap door having a keeper, said latching mechanism comprising a latch member hingedly carried by said frame and adapted to normally engage said keeper and to be disengaged therefrom upon movement of the latch member in either direction about its hinge axis, a counterweight member hingedly carried by said frame, a stop carried by said frame, a stop carried by said frame and adapted to limit movement of said counterweight member in one direction, said counterweight member carrying a second stop adapted to bear on said latch member to position same in its engaged position when said counterweight member is against the first stop, one of said stops being selectively adjustable to vary the relative engaging position of said latch member and said keeper.

References Cited in the file of this patent

UNITED STATES PATENTS

| Number | Name | Date |
| --- | --- | --- |
| 1,073,094 | Coleman | Sept. 16, 1913 |
| 1,143,698 | Green | June 22, 1915 |
| 1,464,358 | Gneinsky | Aug. 7, 1923 |
| 1,802,253 | Hein et al. | Apr. 21, 1931 |
| 1,831,688 | Snider | Nov. 10, 1931 |